(12) United States Patent
Shibata et al.

(10) Patent No.: US 6,672,043 B2
(45) Date of Patent: Jan. 6, 2004

(54) LAWN MOWER FOR DIRECTING GRASS CLIPPINGS TO A GRASS CATCHER

(75) Inventors: Takashi Shibata, Sakai (JP); Takashi Fujii, Sakai (JP); Hideya Umemoto, Sakai (JP); Takeshi Komorida, Sakai (JP); Hiroyuki Tada, Sakai (JP); Nobuyuki Yamashita, Izumi (JP); Shoso Ishimori, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/228,387

(22) Filed: Aug. 26, 2002

(65) Prior Publication Data

US 2003/0182914 A1 Oct. 2, 2003

(30) Foreign Application Priority Data

Mar. 27, 2002 (JP) ........................................ 2002-088527

(51) Int. Cl.⁷ .......................... A01D 43/06; A01D 67/00
(52) U.S. Cl. ........................................ 56/202; 56/320.2
(58) Field of Search .............................. 56/10.4, 320.1, 56/320.2, 10.2 J, 204, 202, 205, 206

(56) References Cited

U.S. PATENT DOCUMENTS

| | | | | |
|---|---|---|---|---|
| 2,990,666 | A | * 7/1961 | Blume | 56/13.4 |
| 3,199,277 | A | * 8/1965 | Moody | 56/16.6 |
| 3,893,284 | A | * 7/1975 | Thon et al. | 56/202 |
| 4,158,279 | A | * 6/1979 | Jackson | 56/202 |
| 4,233,806 | A | * 11/1980 | Richardson | 56/202 |
| 4,637,203 | A | 1/1987 | Fedeli | |
| 5,960,613 | A | 10/1999 | Mixon et al. | |
| 6,050,072 | A | 4/2000 | Chabrier et al. | |
| 6,148,595 | A | 11/2000 | Rabe et al. | |
| 6,360,517 | B1 | * 3/2002 | Ishimori et al. | 56/320.1 |
| 6,484,486 | B2 | * 11/2002 | Nagai et al. | 56/16.8 |

FOREIGN PATENT DOCUMENTS

JP   2001045827   2/2001

* cited by examiner

Primary Examiner—Thomas B. Will
Assistant Examiner—Alicia Torres
(74) Attorney, Agent, or Firm—Webb Ziesenheim Logsdon Orkin & Hanson, P.C.

(57) ABSTRACT

A lawn mower for directing grass clippings to a grass catcher. The lawn mower includes a vehicle body and a mower unit supported by the vehicle body to be vertically movable for varying a height thereof above the ground. The mower unit includes a housing, cutting blades rotatable about vertical shafts, and a grass clippings discharge channel connected to the housing and opening downward for rearwardly directing grass clippings cut by the cutting blades. The lawn mower further includes a grass collecting duct for connecting a discharge opening of the grass clippings discharge channel to the grass catcher, and a receiving plate having a receiving surface for covering the downward opening of the grass clippings discharge channel. The receiving plate is pivotable about a transverse shaft between a grass clippings guiding position in which the receiving surface extends parallel to a flow of grass clippings through the grass clippings discharge channel and a grass clippings removing position in which the receiving surface has a large tilt angle relative to the ground. A swing range limiting mechanism is provided for reducing a swing range of the receiving plate as the mower unit is lowered relative to the ground.

4 Claims, 6 Drawing Sheets

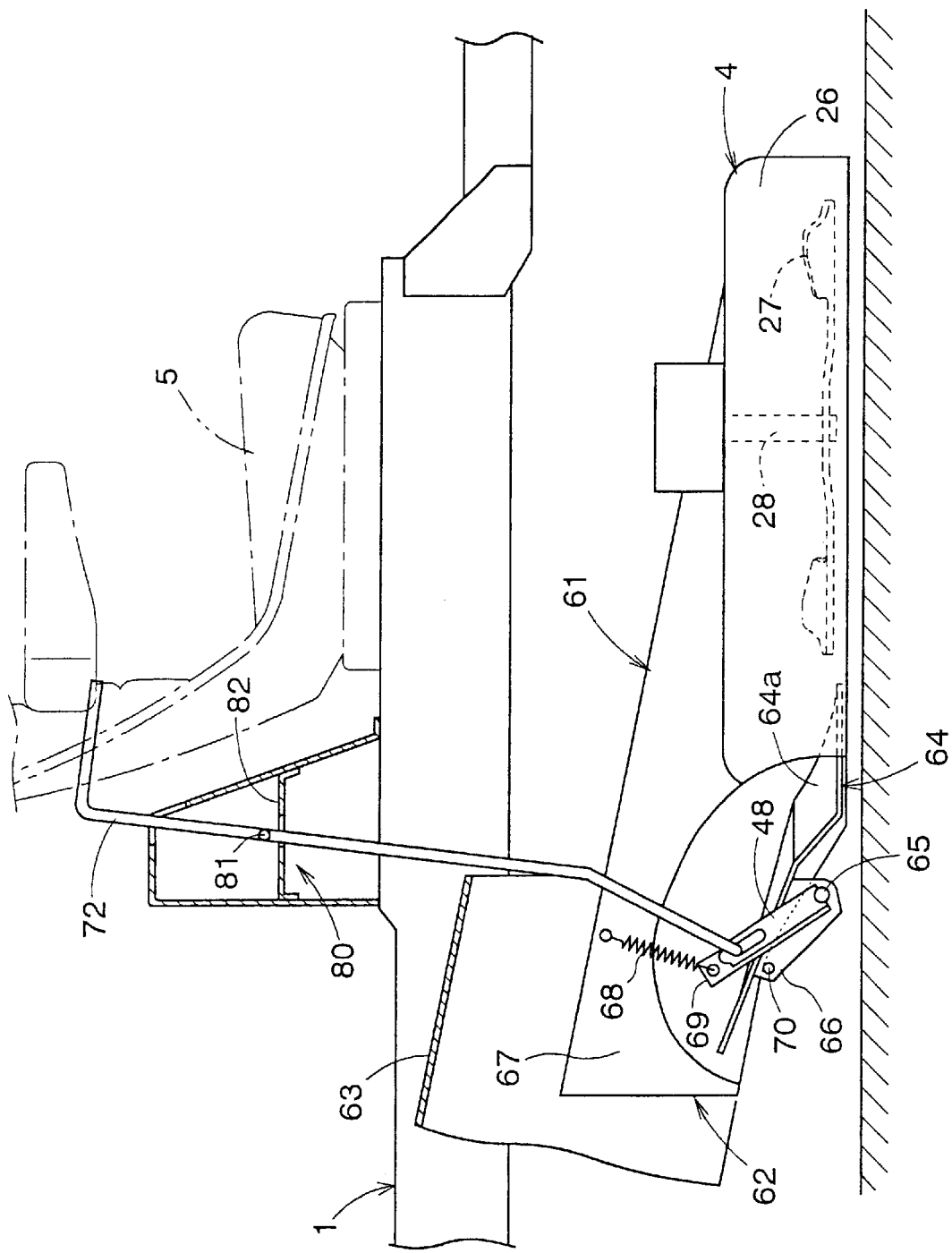

LAWN MOWER FOR DIRECTING GRASS CLIPPINGS TO A GRASS CATCHER

BACKGROUND OF THE INVENTION

1. Field of the Invention

This invention relates to a lawn mower for directing grass clippings to a grass catcher. More particularly the invention relates to a lawn mower including a mower unit supported to be vertically movable by a vehicle body and having a receiving plate with a receiving surface for covering a downward opening of a glass clippings discharge channel connected to a housing of the mower unit for rearwardly directing the grass clippings cut by cutting blades, in which the receiving plate is swingable about a transverse shaft between a grass clippings guiding position where the receiving surface extends parallel to a flow of grass clippings through the grass clippings discharge channel and a grass clippings removing position where the receiving surface has a large tilt angle relative to the ground.

2. Description of the Related Art

One example of the above-noted conventional lawn mower is disclosed in Japanese Patent Publication Kokai No. 2001-45827. In the conventional mower, the receiving plate provided in the downward opening of the grass clippings discharge channel is vertically swingable about the transverse support shaft in response to operation of a control lever attached to the housing, thereby to easily remove the grass clippings adhering to the receiving surface of the receiving plate.

With such a structure, the greater the fore and aft length of the receiving plate is, the higher grass collecting performance is expected. However, when the receiving plate having an increased fore and aft length is vertically swung, there is a possibility of the receiving plate being deformed through contact at a distal end portion thereof with the ground. Such deformation of the receiving plate lowers the grass clippings guiding performance, which results in an unsmooth transportation of the grass clippings to the grass catcher.

SUMMARY OF THE INVENTION

An object of this invention is to provide a lawn mower having an improved structure for easily removing grass clippings adhering to a receiving plate through vertical pivotal movement of the receiving plate, and yet preventing deformation of the receiving plate through contact with the ground even where the receiving plate has a long rearward extension to improve the grass collecting performance.

The above-noted object is fulfilled, according to this invention, by a lawn mower for directing grass clippings to a grass catcher, the lawn mower comprising a vehicle body, a mower unit supported by the vehicle body to be vertically movable for varying a height thereof above the ground, the mower unit including a housing, cutting blades rotatable about vertical shafts, and a grass clippings discharge channel connected to the housing and opening downward for rearwardly directing grass clippings cut by the cutting blades, a receiving plate having a receiving surface for covering the downward opening of the grass clippings discharge channel, the receiving plate being pivotable about a transverse shaft between a grass clippings guiding position in which the receiving surface extends parallel to a flow of grass clippings through the grass clippings discharge channel and a grass clippings removing position in which the receiving surface has a large tilt angle relative to the ground, a control mechanism for swinging the receiving plate, and a swing range limiting mechanism for reducing a swing range of the receiving plate as the mower unit is lowered relative to the ground.

With this construction, when the mower unit is raised high above the ground, the receiving plate is vertically swung within a relatively large range that is limited by taking into account the rearward extension of the receiving plate and the height of mower unit of that time. On the other hand, when the mower unit is lowered close to the ground, the receiving plate is vertically swung within a relatively small range that is limited by taking into account the rearward extension of the receiving plate and the height of mower unit of that time. Thus, while the receiving plate is given the increased fore and aft length to improve the grass collecting performance, the receiving plate is vertically swung to remove easily the grass clippings adhering to the receiving plate. Since the limiting mechanism appropriately limits the swinging range of the bottom wall, the receiving plate is vertically swingable within a limited range in which the receiving plate does not contact the ground regardless of the height of the mower unit over the ground.

In order to simplify the swing range limiting mechanism, it is desirable to incorporate the limiting mechanism into the control mechanism. In a specific example of such a swing range limiting mechanism, the control mechanism includes a control rod linked to the receiving plate, and the swing range limiting mechanism has a contactable member provided in the vehicle body and a contact member provided in the control rod to be placed closer to the contactable member as the mower unit is lowered relative to the ground.

With the limiting mechanism including the contactable member and the contact member, it is clear that this lawn mower has a simplified structure, and thus low manufacturing cost, as compared with a structure employing a stop mechanism having a sensor for detecting a height of the mower unit above the ground and an electromagnetic cylinder for varying the swingable range of the receiving plate from the grass clippings guiding position based on results of detection by the sensor.

With the swing range limiting mechanism according to this invention being employed, it is not required to visually confirm a positional relationship between the receiving plate in vertical pivotal movement and the ground, which makes it possible to provide the control mechanism for the receiving plate to be operable by the driver seated on the driver'seat.

Other features and advantages of this invention will be apparent from the following description of the embodiment to be taken with reference to the drawings.

BRIEF DESCRIPTION OF THE DRAWINGS

FIG. 6 is a side view in vertical section showing a pivoting range of the receiving plate when the mower unit is lowered.

DESCRIPTION OF THE PREFERRED EMBODIMENT

Figure 1:
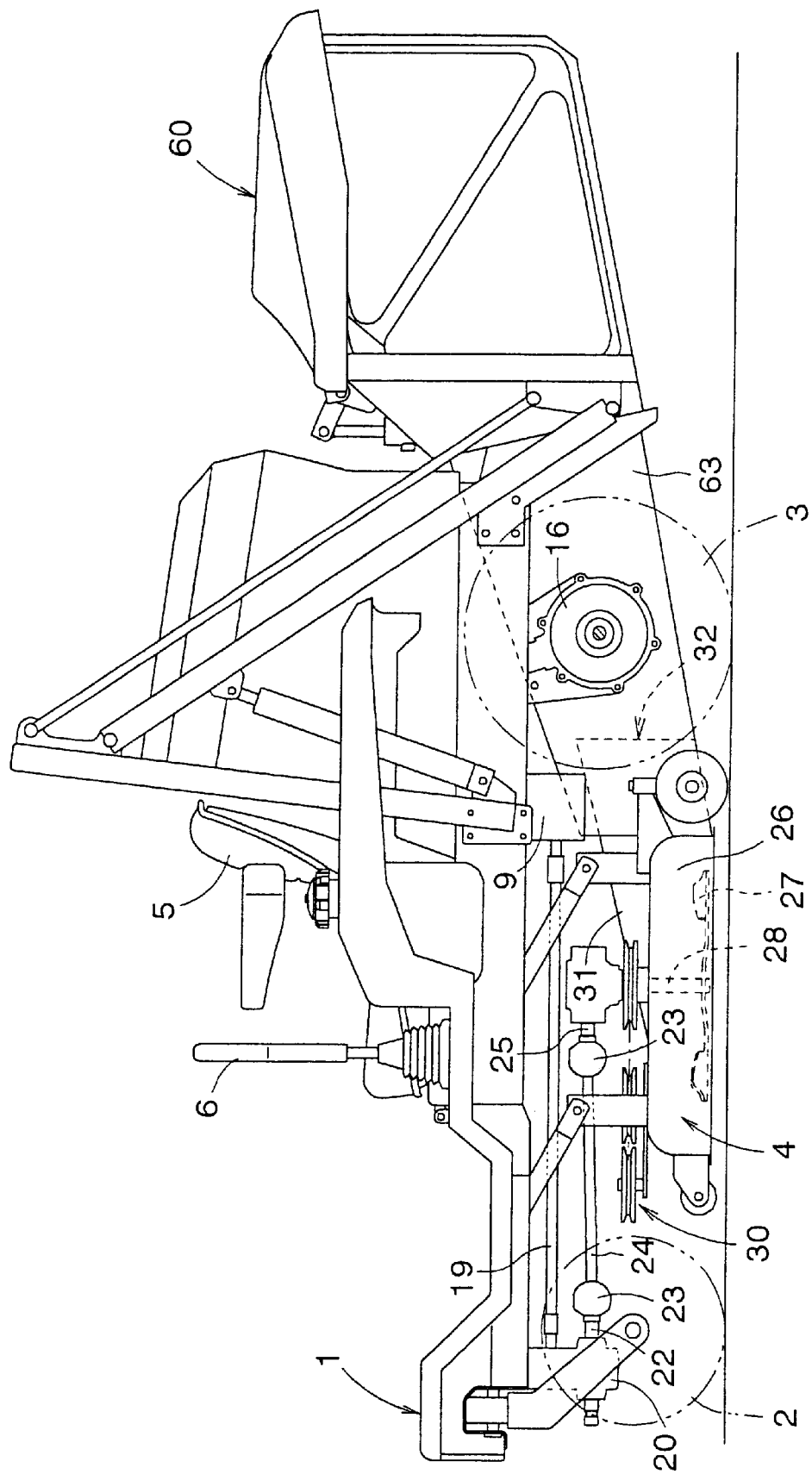
FIG. 1 is a side elevation of a lawn mower according to this invention.

FIG. 1 shows a side elevation of a lawn mower having a pair of right and left caster type wheels 2 acting as front wheels disposed at the front of a vehicle body 1 and a pair of right and left drive wheels 3 acting as rear wheels disposed at the rear of vehicle body 1. This lawn mower is the mid-mount type with a mower unit 4 vertically movably supported by the vehicle body 1 between the front wheels 2 and rear wheels 3. The mower unit 4 is referred to as a rear discharge type mower.

As shown in FIGS. 1 through 4, the vehicle body 1 has a driver'seat 5 disposed over the mower unit 4, and shift levers 6 at the right and left sides of the driver'seat 5. An engine 7 is mounted on an upward rear portion and in a transversely middle position of the vehicle body 1 rearwardly of the driver'seat 5. Drive is transmitted from the engine 7 through a ball joint 8 that allows displacements of a transmission axis due to vibration, to an input shaft 10 of a transmission case 9 disposed below and forwardly of the engine 7. In the transmission case 9 drive is transmitted from the input shaft 10 through three spur gears 11 to a drive distributing mechanism 12. From this drive distributing mechanism 12 propelling drive is transmitted through a pair of bevel gears 13 and a transversely extending relay shaft 14 to right and left hydrostatic stepless transmissions 15. Drive having undergone a change speed operation by each of the right and left hydrostatic stepless transmissions 15 is transmitted to an axle 3a of the corresponding drive wheel 3 through a reduction mechanism 17 mounted in a right or left axle case 16.

Drive from the engine 7 is transmitted independently to the right and left rear wheels 3 to be switchable between forward rotation and reverse rotation through the corresponding right and left hydrostatic stepless transmissions 15. The right and left shift levers 6 are linked to the right and left hydrostatic stepless transmissions 15, respectively, and are operable to shift the right and left hydrostatic stepless transmissions 15 independently of each other. The lawn mower is switchable between a straight running state with the right and left hydrostatic stepless transmissions 15 providing the same speed to rotate the right and left drive wheels 3 at equal speed, and a turning state with the right and left hydrostatic stepless transmissions 15 providing different speeds to rotate the right and left drive wheels 3 at different speeds. Since hydrostatic stepless transmissions 15 are switchable between forward drive and backward drive, the turning state includes a large turning state produced when the right and left drive wheels 3 are driven at different speeds in the same direction, a pivot turning state produced when one of the right and left drive wheels 3 is stopped, and a spin turning state produced when the right and left drive wheels 3 are driven in opposite directions.

Figure 2:
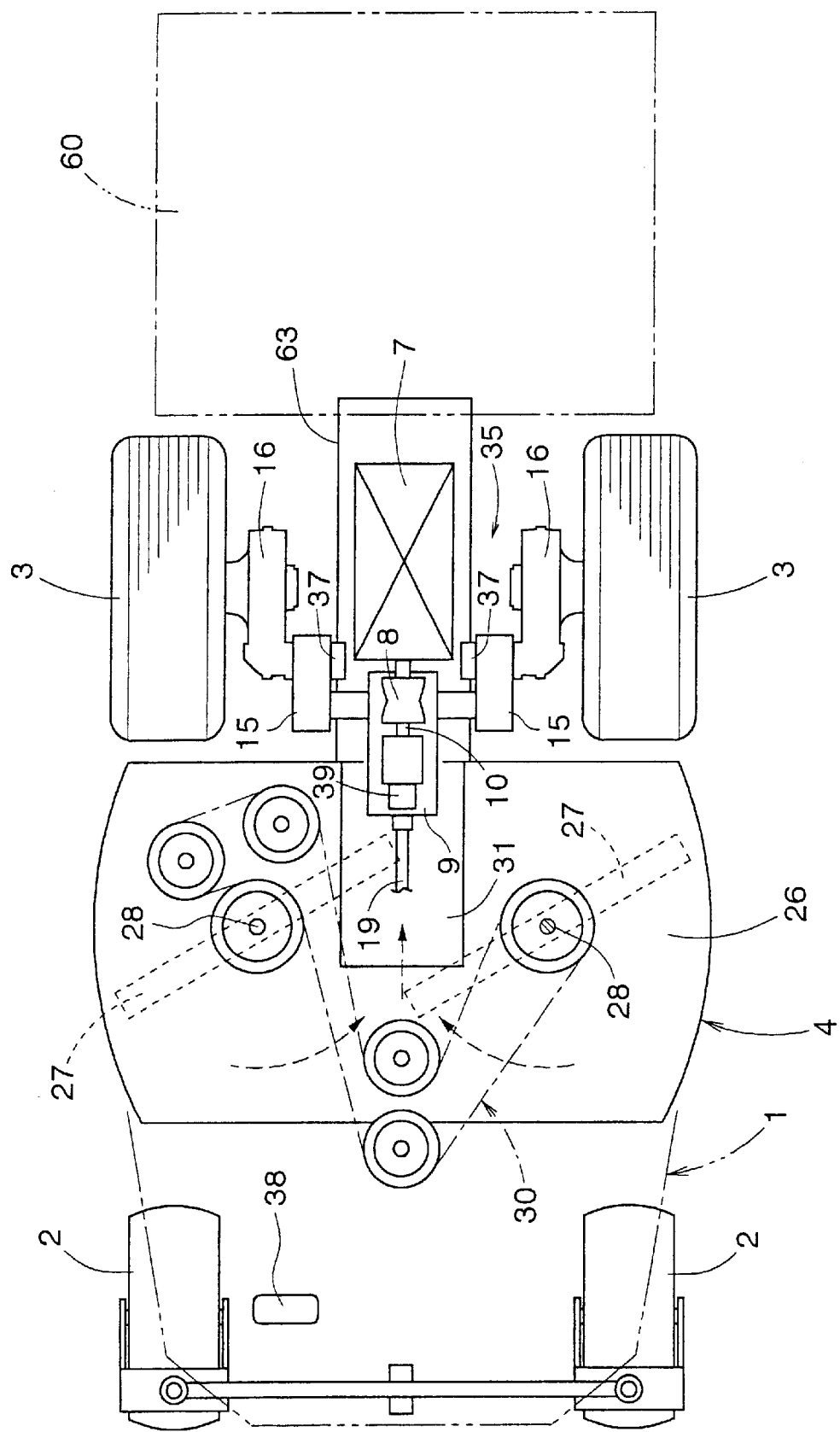
FIG. 2 is a plan view of a principal portion of the lawn mower shown in FIG. 1.
Figure 4:
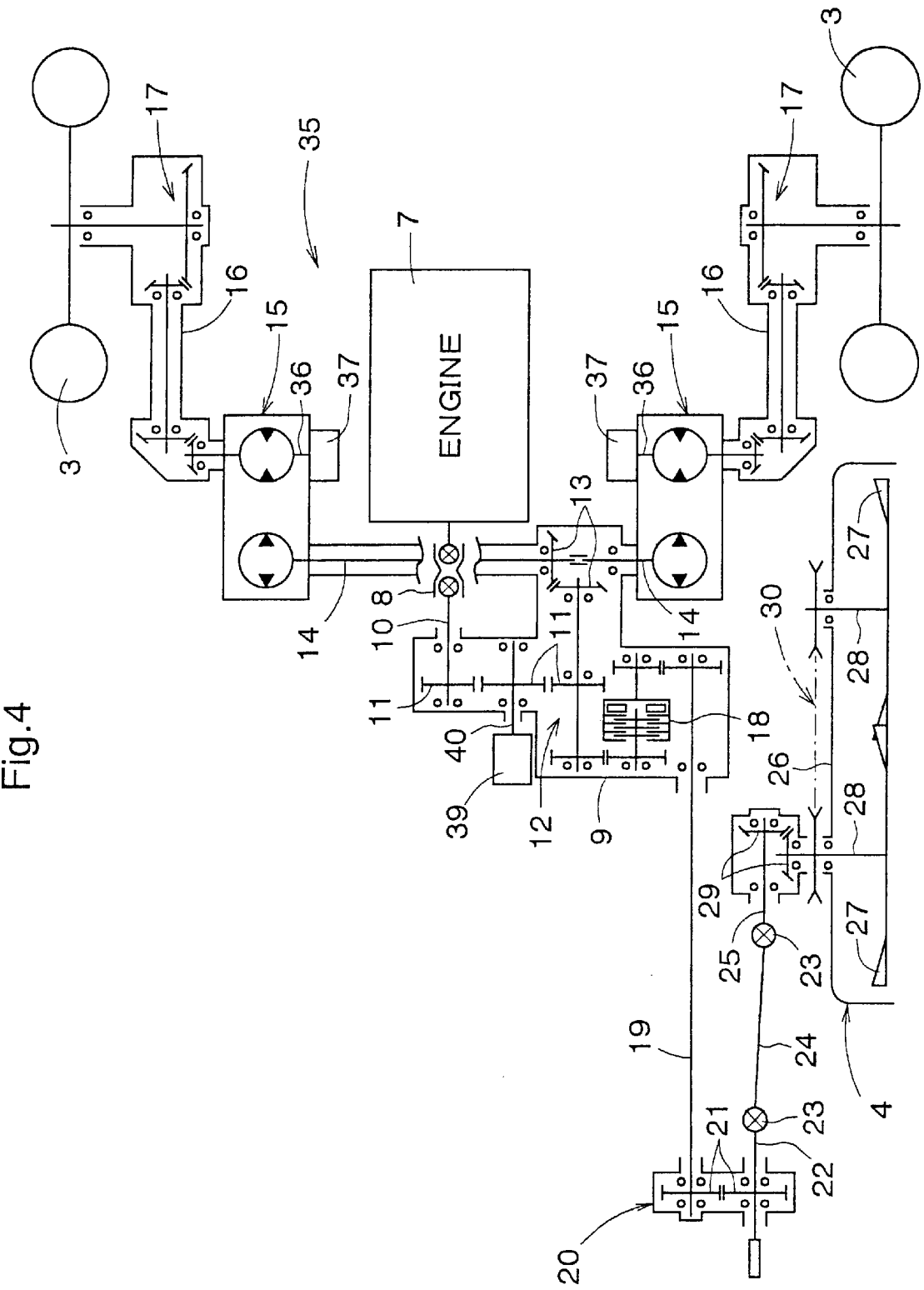
FIG. 4 is a schematic view of a transmission system of the lawn mower shown in FIG. 1.

As shown in FIGS. 1, 2 and 4, the drive distributing mechanism 12 includes a multi-disk type working clutch 18 for transmitting and breaking working power. The working power emerging from the working clutch 18 is transmitted through a first transmission shaft 19 extending fore and aft and a pair of spur gears 21 mounted in a front case 20 at the front of the vehicle body 1 to a power takeoff shaft 22. From the rear end of this power takeoff shaft 22 power is transmitted through a pair of ball joints 23 and a second transmission shaft 24 extending fore and aft to an input shaft 25 of mower unit 4.

Power may be taken also from the forward end of the power takeoff shaft 22. By using the forward end of this power takeoff shaft 22, though not shown in the drawings, power may be transmitted easily to an auxiliary working implement attached to the front of the vehicle body 1.

The mower unit 4 has a housing 26 containing a pair of right and left grass cutting blades 27 rotatable about vertical support shafts 28. The working power transmitted to the input shaft 25 is transmitted to one of the support shafts 28 through a pair of bevel gears 29, and then transmitted from this support shaft 28 to the other support shaft 28 through a belt transmission mechanism 30. The right and left blades 27 are thereby driven to rotate in opposite directions at the same speed, with rotating tracks partly overlapping each other, and the blades moving backward in the overlapping locations. The rotating blades 27 cut grass and generate carrier air flows. The air flows entrain and transport grass clippings to a grass clippings discharge channel 61 extending rearwardly and upwardly and formed in a transversely middle position of a rear wall of the housing 26. The grass clippings are discharged rearwardly and upwardly through a discharge opening 62 of the grass clippings discharge channel 61.

As shown in FIGS. 1 through 4, the right and left hydrostatic stepless transmissions 15 and reduction mechanisms 17 are arranged right and left symmetrical positions opposed to each other across the drive distributing mechanism 12 disposed in the middle position transversely of the vehicle body 1. Thus, the drive distributing mechanism 12, and right and left hydrostatic stepless transmissions 15 and reduction mechanisms 17 constitute a gate-shaped structure defining a space 35 in a lower, transversely middle position. The right and left reduction mechanisms 17 are arranged outwardly of the corresponding hydrostatic stepless transmissions 15. This arrangement secures the relatively large space 35. The grass collecting duct 63 is disposed to extend through a transversely middle position in the space 35.

Thus, the heavy right and left hydrostatic stepless transmissions 15 and reduction mechanisms 17 are symmetrically arranged right and left, and the light, hollow grass collecting duct 63 is disposed to extend through the transversely middle position in the space 35 defined by the hydrostatic stepless transmissions 15 and reduction mechanisms 17. The lawn mower has improved right and left balance, and grass clippings discharged from the mower unit 4 may collect in the grass catcher 60 in a balanced way. Moreover, with the right and left reduction mechanisms 17 arranged outwardly of the corresponding hydrostatic stepless transmissions 15, the reduction mechanisms 17 effectively reduces the chances of damage of the relatively expensive hydrostatic stepless transmissions 15 due to contact with other objects. The relatively large space 35 facilitates positioning of the grass collecting duct 63, and increases the distance between the right and left drive wheels 3 to improve the stability of the entire lawn mower.

Figure 3:
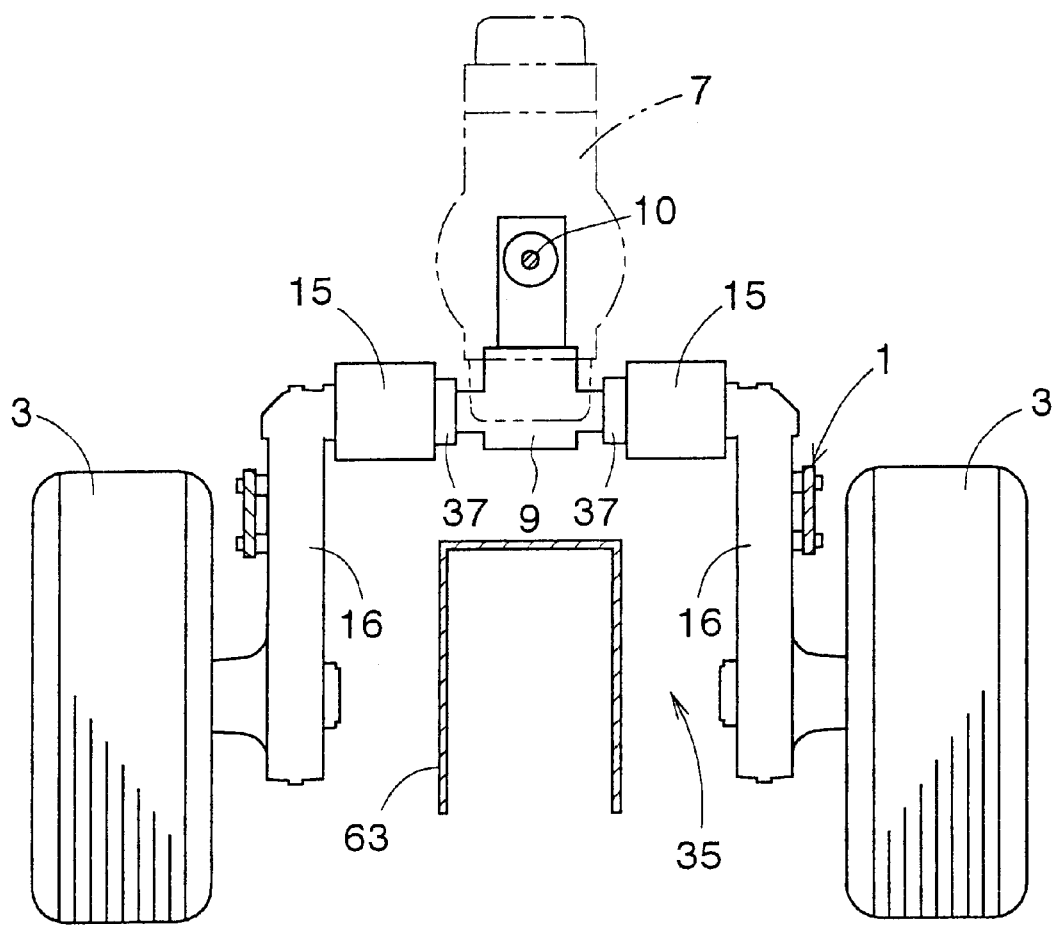
FIG. 3 is a rear view of a principal portion of the lawn mower shown in FIG. 1.

As shown in FIGS. 2 through 4, wet type brakes 37 are disposed inwardly of the right and left hydrostatic stepless transmissions 15 for braking output shafts 36 of the corresponding hydrostatic stepless transmissions 15 to brake the corresponding drive wheels 3, respectively. These right and left wet type brakes 37 are linked to a single brake pedal 38 disposed in a right forward position of the vehicle body 1.

Numeral 39 in FIG. 4 denotes a gear pump driven by rotation of an intermediate shaft 40 rotatable with the middle one of the three spur gears 11 arranged from the input shafts 10 of transmission case 9 to the drive distributing mechanism 12.

Figure 5:
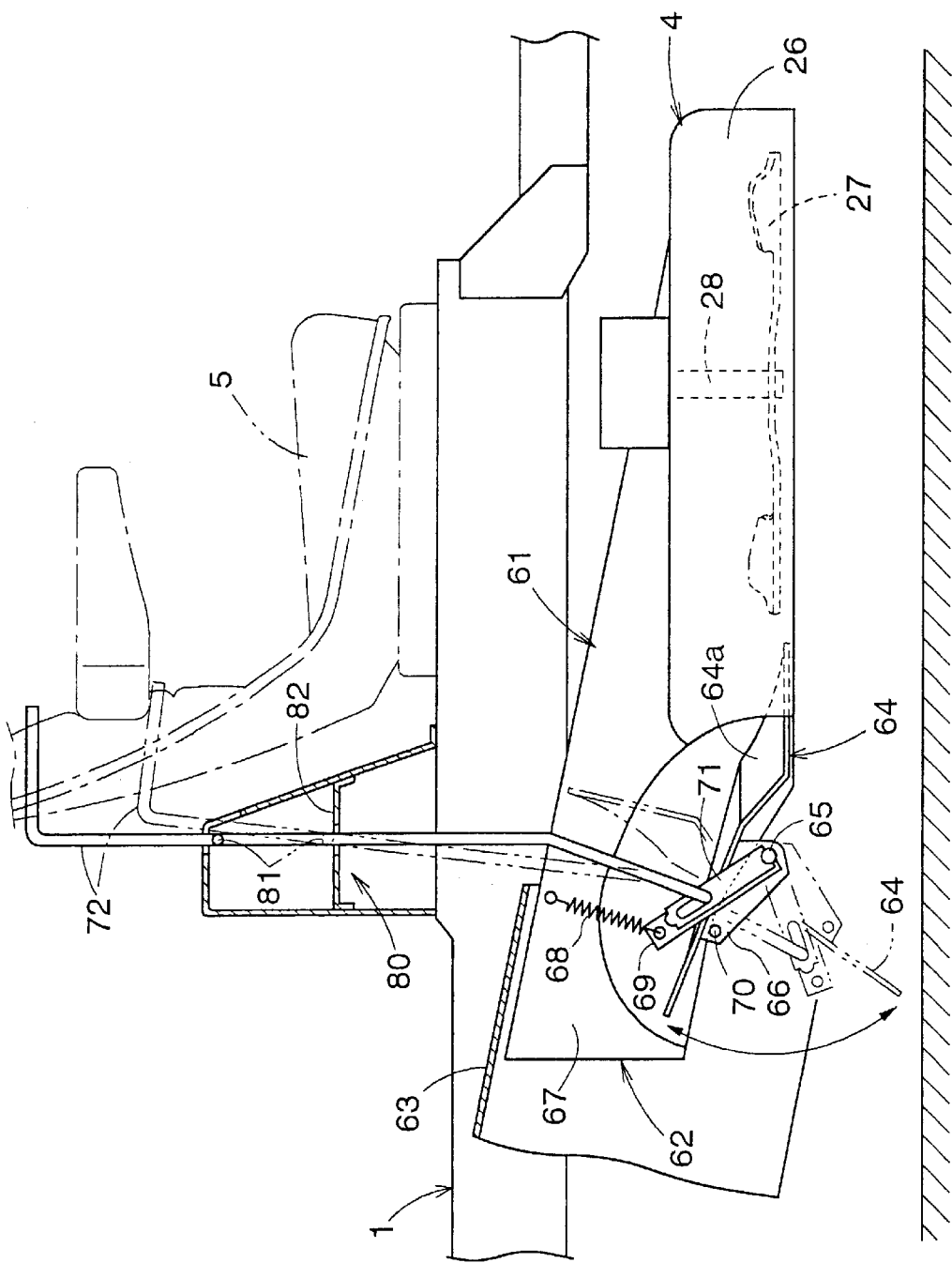
FIG. 5 is a side view in vertical section showing a pivoting range of a receiving plate when a mower unit is raised.

As shown in FIGS. 1, 5 and 6, the grass collecting duct 63 has a U-shaped section opening downward. Grass clippings discharged rearwardly and upwardly from a discharge opening 62 of a grass clippings discharge channel 61 are guided along an upper portion of grass collecting duct 63 to the grass catcher 60.

The grass clippings discharge channel 61 has a gate type profile structure opening downward As seen from FIG. 5, its opening plane is coverable by a receiving plate 64 having a receiving surface 64a acting as a bottom wall of grass clippings discharge channel 61.

Grass clippings discharged from the discharge opening 62 of grass clippings discharge channel 61 are guided by the grass collecting duct 63 connected to the grass clippings discharge channel 61, to the grass catcher 60 mounted at the rear of the vehicle body 1.

As shown in FIGS. 5 and 6, the receiving plate 64 for covering the downwardly opening plane of grass clippings discharge channel 61 is vertically pivotably supported through a support arm 66 by a transverse pivot shaft 65 attached to a bracket fixed to the grass clippings discharge channel 61. The pivot shaft 65 has a first arm 69 fixed thereto and extending rearward. The first arm 69 and receiving plate 64 are interlocked to each other. The rearwardly extending first arm 69 is biased clockwise by a tension spring 68 extending between a free end of the first arm 69 and a side wall 67 of grass clippings discharge channel 61. The first arm 69 biased by the tension spring 68 is maintained in a predetermined grass clippings guiding position by a stopper pin 70 projecting from the support arm 66 and contacting a lower edge of the side wall 67. In this grass clippings guiding posture, the receiving surface 64a of receiving plate 64 extends parallel to the flow of grass clippings through the grass clippings discharge channel 61. Further, a second arm 71 is fixed to the pivot shaft 65, and a control lever 72 is connected to the second arm 71 through a slot formed in the second arm 71. With this construction, the receiving plate 64 is vertically pivotable in response to operation of the control lever 72. The control lever 72 extends upward to a position at the right side of the driver'seat 5.

That is, the driver seated on the driver'seat 5 may operate the control lever 72 to swing the receiving plate 64 toward a grass clippings removing position in which the receiving surface 64a has a large tilt angle relative to the ground. In this position, grass clippings adhering to the receiving surface 64a of receiving plate 64 may readily be removed. It is thus possible to avoid, with ease, lowering of grass clippings collecting efficiency due to grass clippings adhering to and accumulating on the receiving surface 64a of receiving plate 64.

To achieve improved collecting performance, the receiving plate 64 is formed to extend a large amount rearward. Consequently, when the receiving plate 64 is swung up and down, its rear end tends to contact the ground, resulting in a deformation of the receiving plate 64. This lawn mower, therefore, includes a swinging range limiting mechanism 80 for limiting a range of swinging of the receiving plate 64 from the grass clippings guiding position to the grass clippings removing position to prevent the receiving plate 64 from contacting the ground.

The limiting mechanism 80 is formed of a contact pin 81 acting as contact member provided on the control lever 72, and a guide plate 82 acting as contactable member provided on the vehicle body 1 for supporting the control lever 72 and contacting the contact pin 81 to prevent the receiving plate 64 from contacting the ground. With this construction, the lower the mower unit 4 is set relative to the ground, the closer the contact pin 81 is placed to the guide plate 82. The swinging range of the receiving plate 64 is thereby limited to reduce an amount of pivotal movement of the receiving plate 64 from the grass clippings guiding position.

That is, when the control lever 72 is operated with the mower unit 4 raised high above the ground, the receiving plate 64 is vertically swung within a relatively large range that is limited by taking into account the rearward extension of receiving plate 64 and the height of mower unit 4 of that time. When the control lever 72 is operated with the mower unit 4 lowered close to the ground, the receiving plate 64 is vertically swung within a relatively small range that is limited by taking into account the rearward extension of receiving plate 64 and the height of mower unit 4 of that time. As a result, while the receiving plate 64 is given the increased fore and aft length to improve the grass collecting performance, an operation of the control lever 72 vertically swings the receiving plate 64 to remove easily the grass clippings adhering to the receiving plate 64. In time of the grass clippings removing operation, the limiting mechanism 80 appropriately limits the swinging range of the receiving plate 64 regardless of the height of the mower unit 4 over the ground. This precludes the possibility of the receiving plate 64 in vertical pivotal movement being deformed through contact with the ground.

What is claimed is:

1. A lawn mower for directing grass clippings to a grass catcher, said lawn mower comprising:
    a vehicle body;
    a mower unit supported by said vehicle body to be vertically movable for varying a height thereof above the ground; said mower unit including:
        a housing;
        cutting blades rotatable about vertical shafts; and
        a grass clippings discharge channel connected to said housing and opening downward for rearwardly directing grass clippings cut by said cutting blades;
    a receiving plate having a receiving surface for covering the downward opening of said grass clippings discharge channel, said receiving plate being pivotable about a transverse shaft between a grass clippings guiding position in which said receiving surface extends parallel to a flow of grass clippings through the grass clippings discharge channel and a grass clippings removing position in which said receiving surface has a large tilt angle relative to the ground;
    a control mechanism for swinging said receiving plate;
    a swing range limiting mechanism for reducing a swing range of said receiving plate as said mower unit is lowered relative to the ground; and
    a grass collecting duct for connecting a discharge opening of said grass clippings discharge channel to said grass catcher.

2. A lawn mower as defined in claim 1, wherein said swing range limiting mechanism is incorporated into said control mechanism.

3. A lawn mower as defined in claim 2, wherein said control mechanism has a control rod linked to said receiving plate, and wherein said swing range limiting mechanism has a contactable member provided in said vehicle body and a contact member provided in said control rod to be placed closer to said contactable member as said mower unit is lowered relative to the ground.

4. A lawn mower as defined in claim 1, wherein said control mechanism is operable by the driver seated on a driver'seat.

* * * * *